United States Patent
Monnier

(10) Patent No.: US 11,603,424 B2
(45) Date of Patent: Mar. 14, 2023

(54) CROSSLINKABLE COMPOSITIONS HAVING A LOW VISCOSITY FOR COATINGS AND MATERIALS HAVING A HIGH REFRACTIVE INDEX AND HAVING A HIGH HEAT DEFLECTION TEMPERATURE

(71) Applicant: Arkema France, Colombes (FR)

(72) Inventor: Guillaume Monnier, Verneuil en Halatte (FR)

(73) Assignee: Arkema France, Colombes (FR)

( * ) Notice: Subject to any disclaimer, the term of this patent is extended or adjusted under 35 U.S.C. 154(b) by 168 days.

(21) Appl. No.: 17/274,635

(22) PCT Filed: Sep. 9, 2019

(86) PCT No.: PCT/FR2019/052069
§ 371 (c)(1),
(2) Date: Mar. 9, 2021

(87) PCT Pub. No.: WO2020/053512
PCT Pub. Date: Mar. 19, 2020

(65) Prior Publication Data
US 2021/0340296 A1 Nov. 4, 2021

(30) Foreign Application Priority Data

Sep. 11, 2018 (FR) ...................................... 1858126

(51) Int. Cl.
| | | |
|---|---|---|
| *C08F 222/10* | (2006.01) | |
| *B33Y 10/00* | (2015.01) | |
| *B33Y 70/00* | (2020.01) | |
| *B29C 64/129* | (2017.01) | |
| *C08F 2/50* | (2006.01) | |
| *C08F 220/12* | (2006.01) | |
| *C08F 220/20* | (2006.01) | |
| *B33Y 80/00* | (2015.01) | |

(52) U.S. Cl.
CPC ...... *C08F 222/1025* (2020.02); *B29C 64/129* (2017.08); *B33Y 10/00* (2014.12); *B33Y 70/00* (2014.12); *C08F 2/50* (2013.01); *C08F 220/12* (2013.01); *C08F 220/20* (2013.01); *C08F 222/1045* (2020.02); *B33Y 80/00* (2014.12)

(58) Field of Classification Search
CPC ....... B29C 64/129; B33Y 10/00; B33Y 70/00; B33Y 80/00; C08F 2/50; C08F 220/20; C08F 220/12; C08F 220/30; C08F 222/1006; C08F 222/102; C08F 222/1025; C08F 222/1045; C08F 222/106; C08L 33/08; C08L 33/10; C08L 75/16; C09D 4/00; G02B 1/041
See application file for complete search history.

(56) References Cited

U.S. PATENT DOCUMENTS

| | | | | |
|---|---|---|---|---|
| 4,783,491 A | * | 11/1988 | Tsunekawa | A61K 6/25 433/199.1 |
| 5,907,000 A | * | 5/1999 | Treadway | C08F 265/06 522/182 |
| 7,312,290 B2 | * | 12/2007 | Chisholm | C08F 222/1067 526/321 |
| 2006/0069222 A1 | * | 3/2006 | Chisholm | C08F 222/24 526/321 |
| 2006/0128853 A1 | * | 6/2006 | Olson | C08F 222/1025 524/409 |
| 2006/0189706 A1 | * | 8/2006 | Tokuda | G02B 3/0031 522/109 |
| 2006/0293463 A1 | * | 12/2006 | Olson | C08F 220/1811 525/330.3 |
| 2007/0082988 A1 | * | 4/2007 | Olson | C08L 33/14 524/556 |

FOREIGN PATENT DOCUMENTS

| | | | |
|---|---|---|---|
| CN | 108384326 A | 8/2018 | |
| EP | 710475 A1 * | 5/1996 | ........... A61K 6/0085 |
| EP | 2586802 A1 | 5/2013 | |
| EP | 2664635 A1 | 11/2013 | |
| EP | 2684903 A1 | 1/2014 | |
| IL | 65789 A * | 8/1985 | |
| WO | WO-2006036489 A1 * | 4/2006 | ............ C08F 220/10 |
| WO | WO-2007001811 A1 * | 1/2007 | ............ C08F 120/10 |
| WO | 2014126830 A2 | 8/2014 | |
| WO | 2014126834 A2 | 8/2014 | |
| WO | 2014126837 A2 | 8/2014 | |

OTHER PUBLICATIONS

Tumbleston et al., "Continuous Liquid Interface Production of 3D Objects", Science, vol. 347, Issue 6228, pp. 1349-1352 (Mar. 20, 2015).

* cited by examiner

*Primary Examiner* — Sanza L. McClendon
(74) *Attorney, Agent, or Firm* — Christopher R. Lewis

(57) ABSTRACT

The invention relates to a crosslinkable composition, which comprises a component a) at least one halogenated bisphenol A diglycidyl ether tetra(meth)acrylate and a component b) at least one diluent from mono(meth)acrylates of a monoalcohol comprising a biphenyl structure, and at least one optional component from components c), d), e), f) and g). It also relates to its use for coatings or materials, in particular for 3D printed articles for optical applications, as it also relates to the crosslinked composition and to the finished product, in particular the 3D article which results therefrom.

32 Claims, No Drawings

CROSSLINKABLE COMPOSITIONS HAVING A LOW VISCOSITY FOR COATINGS AND MATERIALS HAVING A HIGH REFRACTIVE INDEX AND HAVING A HIGH HEAT DEFLECTION TEMPERATURE

CROSS-REFERENCE TO RELATED APPLICATIONS

This application is a U.S. national stage application under 35 U.S.C. § 371 of international application number PCT/FR2019/052069, filed Sep. 9, 2019, which claims priority to French patent application number 1858126, filed Sep. 11, 2018.

FIELD OF THE INVENTION

The present invention relates to a crosslinkable, in particular photocrosslinkable, composition (formulation), having a low viscosity when used which is suitable for the preparation of coatings or of 3D materials having a high refractive index (RI) and having a high heat deflection temperature (HDT), in particular suitable for the manufacture of 3D printed objects for optical applications.

BACKGROUND OF THE INVENTION

Crosslinkable and in particular photocrosslinkable formulations for optical objects already exist but these are not suitable for the manufacture of optical objects by 3D printing, which requires specific physicochemical properties. There also exist photocrosslinkable formulations for 3D printing but which are not suitable for optical applications or do not meet the performance qualities required for optical applications. There is thus a need for novel compositions for optical applications which can be 3D printed for the preparation of three-dimensional objects (articles). Among the performance qualities required for the 3D printing of optical objects, the crosslinkable compositions of the present invention have to satisfy at least the following important criteria not fulfilled by those known from the state of the art:
- viscosity when used (25° C. being taken as reference temperature) of less than 5000 mPa·s, preferably of less than 2500 mPa·s and more preferably of less than 1500 mPa·s,
- a heat deflection temperature (HDT) according to the ISO 75 (2004) method after crosslinking of at least 70° C. and preferably of greater than 80° C.,
- a refractive index (RI) before crosslinking according to the standard ASTM 1218-02 of at least 1.47, preferably of greater than 1.52 and more particularly of greater than 1.56 and, after crosslinking, of at least 1.50, preferably of greater than 1.55 and more particularly of greater than 1.59.

More particularly, the crosslinked formulations have to have a Young's modulus at 25° C. according to the ISO 527 (1995) method of at least 1800 MPa, preferably of at least 2000 MPa.

EP 2 586 802 B1 describes a composition which can crosslink under radiation by the radical route suitable for lenses having a high refractive index and comprising, as essential components, a phenylbenzyl (meth)acrylate and an aromatic urethane (meth)acrylate. The presence of bisphenol A diglycidyl ether tetra(meth)acrylate is neither described nor suggested by this document.

EP 2 664 635 B1 relates to the same field of application as the abovementioned document and describes a composition which can crosslink under radiation by the radical route suitable for lenses having a high refractive index and comprising, as essential components, phenylbenzyl (meth)acrylate with a limited ratio between o- and p-isomers of the benzylphenyl (meth)acrylate, additionally comprising an epoxy (meth)acrylate of aromatic structure. The presence of halogenated bisphenol A diglycidyl ether tetra(meth)acrylate is neither described nor suggested by this document either.

EP 2 684 903 B1 describes similar compositions for the same use with the presence of a phenylbenzyl (meth)acrylate component with a specific ratio between o- and p-isomers and the presence of a second (meth)acrylate component comprising, in its structure, biphenyls connected by a methylene, the said composition not comprising urethane (meth)acrylate. The presence of halogenated bisphenol A diglycidyl ether tetra(meth)acrylate is neither described nor suggested by this document either.

SUMMARY OF THE INVENTION

The $1^{st}$ subject-matter of the invention thus relates to a crosslinkable composition comprising two essential components a) and b) as defined below and optionally other components c), d), e), f) and g) as defined below.

Another subject-matter of the invention relates to the use of the said composition for the preparation of coatings and of materials having a high RI and a high HDT.

The crosslinked composition also comes within the invention as a finished product resulting from the crosslinking of the said composition or comprising the said crosslinked composition.

DETAILED DESCRIPTION OF THE INVENTION

The first subject-matter of the invention thus relates to a crosslinkable composition (also known as formulation for this invention) which comprises a component a) at least one halogenated bisphenol A diglycidyl ether tetra(meth)acrylate (also known subsequently by the shortened form "halogenated bisphenol A tetra(meth)acrylate") and a component b) at least one diluent from mono(meth)acrylates of a monoalcohol comprising a biphenyl structure, the said biphenyl optionally being halogenated,
and optionally at least one component chosen from the components c), d), e), f) and g) as defined as follows or their combinations:
c) at least one (meth)acrylated oligomer carrying at least 4 (meth)acrylate functional groups per (tetra(meth)acrylate) chain, with the said oligomer comprising at least 2 units of halogenated bisphenol A structure in the said oligomer chain, the said at least 2 units of halogenated bisphenol A structure in particular being connected by an ether group,
d) at least one di(meth)acrylate of an epoxidized biphenyl derivative, the said biphenyl optionally being halogenated,
e) an optionally halogenated bisphenol A diglycidyl ether di(meth)acrylate,
f) at least one monomer other than a), b), d) and e),
g) at least one oligomer from the urethane (meth)acrylate, polyester (meth)acrylate and polyether (meth)acrylate structures.

As regards the optional components c) to g), they can be present in the said composition either each alone in combination with the components a) and b) as defined above, or in combination with one or more other components from the components c) to g).

The content by weight of each component a) to g) can be defined with respect to the weight of the components a)+b). This content by weight can be converted into % by weight with respect to the total weight of the composition. For example, if the % by weight of the component c) with respect to a)+b) in a composition a)+b)+c) is equal to x, in this case the % by weight X with respect to the total weight of the composition a)+b)+c) can be calculated according the following formula:

$$X=100x/(100+x)$$

The sum of the % by weight thus calculated of the components present a) and b) and optionally of c) to f), with respect to the total weight of the composition, has to be equal to 100%.

For example, if the content by weight of a), with respect to the weight of a)+b), is 60% and the content by weight of c) in a composition a)+b)+c), with respect to a)+b), is defined as being 30%, in this case the % by weight of c), with respect to the weight of a)+b)+c), will be 100×30/(100+30)=3000/130=23.08% with % of a)=60×100/100+30=46.15% and the % of b) (complement of a) in 100 parts of a)+b) is 40% vs a)+b)) is 40×100/130=30.77% with sum of % a)+b)+c)=23.08+46.15+30.77=100%.

As regards the halogenated components a), c) and e) and the optionally halogenated components b) and d), it is the aromatic structure involved (aromatic nuclei) which is halogenated with replacement of 1 to 2 hydrogens of each aromatic ring by an equivalent number of halogen atoms. In the case of the component a), halogenated bisphenol A tetra(meth)acrylate, the halogen atoms are carried by the two aromatic nuclei of the bisphenol A structure (1 or 2, preferably 2, halogen atoms per aromatic nucleus of the bisphenol A structure).

In the case of the component b) with the optionally halogenated biphenyl group, in this case it is the aromatic nuclei of the biphenyl which carry the said halogen atoms (1 or 2 halogen atoms per aromatic nucleus). The same principle is valid in the case of the optionally halogenated biphenyl of the component d).

As regards the component c) which is based on an oligomer structure derived from bisphenol A, the said tetra(meth)acrylated oligomer comprises, in its chain, at least two units of bisphenol A structure connected by an ether bridge, which means, in this case, that the halogenated component c) comprises at least two halogen atoms more per molecule or per chain than the component a) and with at least 4 halogenated aromatic nuclei for 2 units of halogenated bisphenol A structure (with 1 or 2 halogen atoms per aromatic nucleus).

According to a specific option, the said oligomer as defined according to component c) comprises 2 units of halogenated bisphenol A structure in the said oligomer chain. This means, according to this specific option, that 4 aromatic nuclei are halogenated (with 1 or 2 halogen atoms per aromatic nucleus).

The halogenated (meth)acrylated components a), c) and e) and the optionally halogenated (meth)acrylated components b) and d) can be obtained by (meth)acrylation of the corresponding halogenated epoxide compounds for components a), c) and e) or of a corresponding optionally halogenated epoxide for component d) and by (meth)acrylation of the corresponding optionally halogenated alcohol for the component b).

The halogenated bisphenol A tetra(meth)acrylate a), in particular dihalogenated or tetrahalogenated (meaning carrying 1 or 2 halogen atoms per aromatic nucleus and preferably tetrahalogenated with 2 halogens per aromatic nucleus) can be prepared by esterification of halogenated bisphenol A diglycidyl ether (BADGE), either with (meth)acrylic acid in two stages or in one stage with (meth)acrylic anhydride with first reaction of the epoxide groups by opening of the oxirane ring, with formation of a first (meth)acrylic ester group and of a secondary hydroxyl group, which, after complete (meth)acrylation (vs secondary OH), results in the halogenated BADGE tetra(meth)acrylated component. The molecular weight (or molar mass) of the component a) is preferably less than 1100 g/mol. The halogenated BADGE precursors are commercially available with, for example, a tetrabrominated BADGE derivative being sold under the reference DER 542 by Olin. Similar detailed conditions for (meth)acrylation by (meth)acrylic anhydride of a BADGE for preparing the BADGE tetra(meth)acrylate are already described in U.S. Pat. No. 6,515,166 and can thus be applied to the halogenated BADGE derivative.

More particularly, the component a) is the tetrabrominated bisphenol A diglycidyl ether tetramethacrylate of following formula (I):

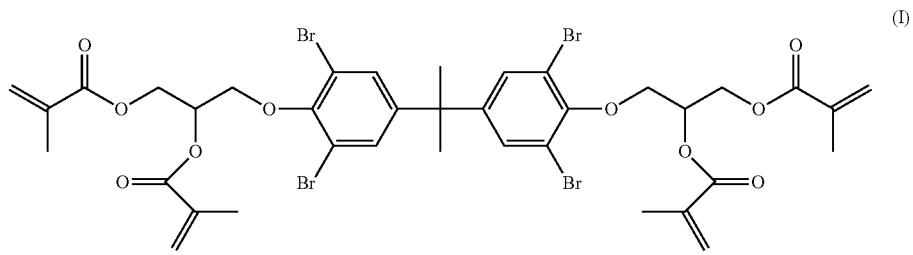 [SMILES: C=C(C)C(=O)OCC(COc1c(Br)cc(C(C)(C)c2cc(Br)c(OCC(COC(=O)C(=C)C)OC(=O)C(=C)C)c(Br)c2)cc1Br)OC(=O)C(=C)C]

(I)

It results from the complete methacrylation by methacrylic anhydride of tetrabrominated bisphenol A diglycidyl ether (DER 542 sold by Olin). The complete methacrylation means the methacrylation per terminal glycidyl group, both of the oxirane (epoxy) group of the said glycidyl and also of the secondary hydroxyl group formed during the opening of the said oxirane ring.

As regards the component b), it can be prepared by (meth)acrylation by (meth)acrylic acid or by (meth)acrylic anhydride of a monoalcohol comprising a biphenyl structure which optionally can be halogenated. Mention may be made, as example of monoalcohol which can be (meth)acrylated in order to obtain the mono(meth)acrylate as defined according to b), of biphenyl-4-methanol, which can be dihalogenated or tetrahalogenated and in particular dibrominated or tetrabrominated.

More particularly, the said component b) is the biphenyl-methanol mono(meth)acrylate of following formula (II):

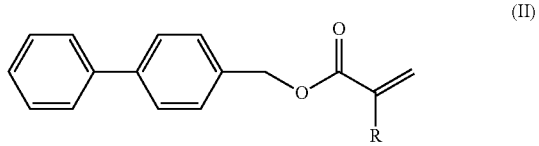

(II)

with R being methyl or H, preferably H.

It is prepared by the (meth)acrylation of biphenyl-4-methanol.

As regards the oligomeric component c), which is a tetra(meth)acrylate of an oligomer comprising at least 2 units of halogenated bisphenol A structure in the said oligomer chain, in particular with an ether bridge connecting the said units of bisphenol A structure, it can be prepared by a method analogous to that for the component a), by complete (meth)acrylation of a diglycidyl ether oligomer precursor (terminal glycidyl groups), the said oligomer comprising, in its oligomer chain, at least 2 units of halogenated bisphenol A structure, in particular the said bisphenol A units being connected together by an ether bridge. The oligomer component c) preferably has a molar mass (or molecular weight) of greater than 1400 g/mol. The said (meth)acrylation can be carried out by (meth)acrylic acid or by (meth)acrylic anhydride, the latter being a faster (meth)acrylation agent. In fact, the complete (meth)acrylation means the (meth)acrylation of the epoxy (oxirane) group of the said glycidyl and of the secondary hydroxyl (OH) group formed after reaction by opening of the epoxy (oxirane) ring, which OH is also (meth)acrylated, with thus two (meth)acrylate groups incorporated per initial terminal glycidyl group, in order to finally form the said oligomer tetra(meth)acrylate comprising at least two halogenated bisphenol A units. According to whether the diglycidyl ether precursor oligomer is dihalogenated, preferably dibrominated, or tetrahalogenated, preferably tetrabrominated, on the unit of bisphenol A structure, the said oligomer tetra(meth)acrylate c) will have dihalogenated or tetrahalogenated, preferably dibrominated or tetrabrominated, bisphenol A units. A specific example of diglycidyl ether oligomer precursor with two tetrahalogenated bisphenol A units connected by an ether bridge and suitable for the preparation of an oligomer as defined according to c) above is the oligomer based on tetrabrominated bisphenol A sold under the reference DER 560 by Olin. More particularly, the said oligomer c) is of following ideal formula (III):

The oligomer c) of formula (III) results from the complete methacrylation with methacrylic anhydride of each of two terminal glycidyl groups of a tetrabrominated oligomer precursor, such as the product sold by Olin under the reference DER 560.

As regards the component d), which is a di(meth)acrylate comprising an optionally halogenated biphenyl structure, it is also prepared by (meth)acrylation by (meth)acrylic acid or by (meth)acrylic anhydride of an epoxidized precursor comprising a biphenyl structure carrying an epoxidized group (which epoxidized group carries an oxirane group). According to whether the said epoxidized precursor is halogenated, the said di(meth)acrylate component d) will also be halogenated. The said biphenyl can be monohalogenated, in particular monobrominated, or dihalogenated, in particular dibrominated.

In an embodiment of the crosslinkable composition according to the invention, the said epoxidized biphenyl derivative di(meth)acrylate as defined according to d) is an optionally halogenated biphenylyl glycidyl ether di(meth)acrylate. An optionally halogenated biphenylyl glycidyl ether di(meth)acrylate may, in particular, be represented by the following formula (IVa):

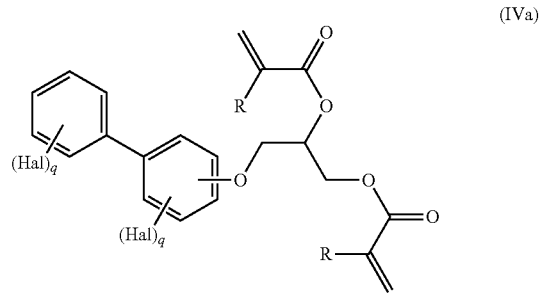

(IVa)

wherein each R is independently H or methyl;
each Hal is independently a halogen atom;
p et q are independently 0, 1 or 2.

More particularly, the said epoxidized biphenyl derivative di(meth)acrylate as defined according to d) is 2-biphenylyl glycidyl ether di(meth)acrylate. The 2-biphenylyl glycidyl ether di(meth)acrylate may, in particular, be represented by the following formula (IVb):

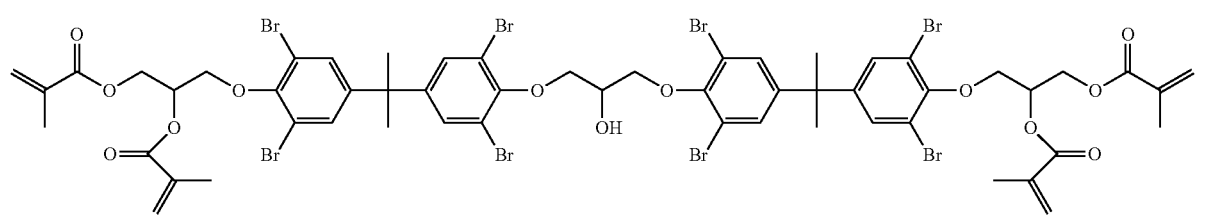

(III)

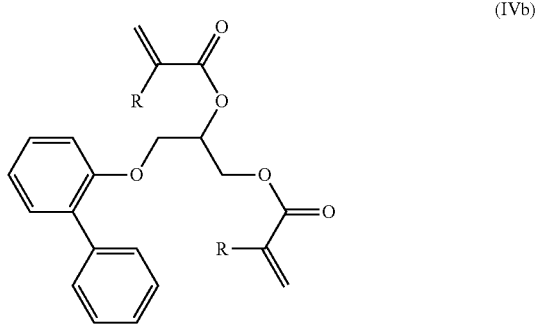

(IVb)

wherein each R is independently H or methyl.

According to a more specific option of the crosslinkable composition according to the invention, the said epoxidized biphenyl derivative di(meth)acrylate as defined according to d) is 2-biphenylyl glycidyl ether dimethacrylate, as defined according to the following formula (IVc):

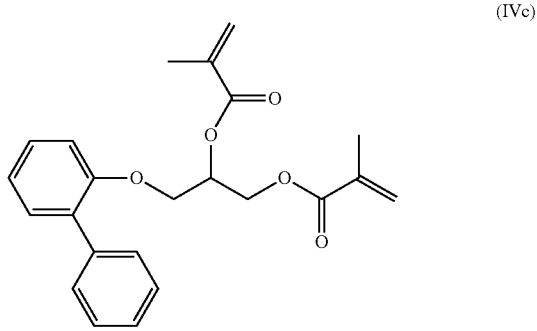 [SMILES: C=C(C)C(=O)OCC(COc1ccccc1-c1ccccc1)OC(=O)C(=C)C]

(IVc)

The optionally halogenated bisphenol A di(meth)acrylate e), in particular dihalogenated or tetrahalogenated (meaning carrying 1 or 2 halogen atoms per aromatic nucleus and preferably tetrahalogenated with 2 halogen atoms per aromatic nucleus) can be prepared by esterification of halogenated bisphenol A diglycidyl ether (BADGE) with (meth)acrylic acid in one stage by opening of the oxirane ring, with formation of a (meth)acrylic ester group and of a secondary hydroxyl group, which results in the optionally halogenated BADGE di(meth)acrylated component. The molecular weight (or molar mass) of the component e) is preferably less than 1100 g/mol.

The said monomer f) as defined in the composition according to the invention has a functionality of (meth)acrylates ranging from 1 to 6 and it is preferably selected from mono(meth)acrylic esters of C1 to C18 aliphatic alcohols or of C6 to C18 cycloaliphatic alcohols or from polyfunctional (meth)acrylic esters (of functionality 2 to 6) of C2 to C18 polyols, in particular from polyfunctional (meth)acrylic esters of C3 to C18 polyols, or from hydroxyalkyl (meth)acrylates, in particular hydroxy(C2-C6 alkyl) (meth)acrylates, epoxy (meth)acrylates, aminoacrylates and urethane (meth)acrylates and optionally the said monomer f) comprises at least one unit of alkoxy structure.

Mention may be made, as suitable examples of (meth)acrylic monoesters of C1 to C18 aliphatic alcohols, of mono(meth)acrylates of C1 to C18 alkanols, such as methyl, ethyl, propyl, butyl, pentyl, hexyl, heptyl, octyl, 2-ethylhexyl, nonyl, decyl, lauryl or stearyl (meth)acrylate or the (meth)acrylate of all their isomers when several isomers are possible for an alkanol, it being possible for the said alkanol to be alkoxylated with 1 to 5 alkoxy units from ethoxy and/or propoxy. Mention may be made, as (meth)acrylic monoesters of C6 to C18 cycloaliphatic alcohols, of the (meth)acrylate of cyclohexanol and of its derivatives substituted on the C6 ring, isobornyl (meth)acrylate, isophoronyl (meth)acrylate or dicyclopentadienyl (meth)acrylate, it being possible for the said (meth)acrylates to be alkoxylated (starting from alkoxylated cycloalkanols), like the (meth)acrylates of the said alkanols.

Mention may be made, as polyfunctional (meth)acrylic esters of C2 to C18 polyols suitable as component f) of the composition according to the invention, of ethylene glycol di(meth)acrylate, diethylene glycol di(meth)acrylate, triethylene glycol di(meth)acrylate, propylene glycol di(meth)acrylate, dipropylene glycol di(meth)acrylate, butylene glycol di(meth)acrylate, pentanediol di(meth)acrylate, neopentyl glycol di(meth)acrylate, hexanediol di(meth)acrylate, cyclohexanediol di(meth)acrylate, tricyclodecanedimethanol di(meth)acrylate, glycerol tri(meth)acrylate, trimethylolpropane tri(meth)acrylate, di(trimethylolpropane) ether tetra(meth)acrylate, pentaerythritol tetra(meth)acrylate or di(pentaerythritol) ether hexa(meth)acrylate.

Mention may be made, as hydroxyalkyl (meth)acrylate monomers suitable as component f), of the monohydroxy (meth)acrylic esters of polyols with an OH functionality at the start ranging from 2 to 6 and more particularly of 2. In the case of diols, they are monohydroxy (meth)acrylic monoesters. In the case of polyols with a functionality of greater than 2 (3 to 6), the said monohydroxy (meth)acrylic esters can comprise, in addition to the hydroxyl functional group, from 2 to 5 (meth)acrylate functional groups for one hydroxyl functional group. Preferably, the said hydroxyalkyl (meth)acrylates are monohydroxy (meth)acrylic monoesters of a C2 to C6 alkylene diol and more preferably they are hydroxyethyl (meth)acrylate, hydroxypropyl (meth)acrylate or hydroxybutyl (meth)acrylate.

Another specific category of (meth)acrylic monomers with a functionality of 1 to 6 which may be suitable as monomer f) in the composition according to the invention is the category of epoxy (meth)acrylates. These monomers, if they are not alkoxylated, can be prepared by the esterification by (meth)acrylic acid of an epoxidized precursor compound of the epoxy (meth)acrylate monomer targeted, with the said epoxidized precursor having a functionality of epoxy (oxirane) groups which is identical to the functionality of (meth)acrylates of the epoxy (meth)acrylate monomer targeted. Such a (meth)acrylation with opening of the oxirane ring results in a (meth)acrylic ester group and a secondary OH group for each oxirane group which has reacted. In the case of alkoxylated epoxy (meth)acrylates, the alkoxylation is carried out directly on the epoxidized compound with formation of an ether bridge between the terminal oxirane of the epoxidized compound and the alkylene oxide (ethylene oxide and/or propylene oxide) used as alkoxylating agent, resulting, for a diepoxidized epoxidized precursor, such as bisphenol A diglycidyl ether, in an alkoxylated diol of the bisphenol A diglycidyl ether, which can be (meth)acrylated by esterification with (meth)acrylic acid, obtaining, in the case of the alkoxylated derivative of bisphenol A diglycidyl ether, the alkoxylated di(meth)acrylate of bisphenol A diglycidyl ether (for example with 1 to 10 ethoxy and/or propoxy units).

As other monomers suitable as component f) in the composition according to the invention as defined above, there is the category of the aminoacrylates with a functionality ranging from 1 to 5. These monomers comprise an aminoacrylate =N—CH2-CH2 group which results from the Michael reaction by addition of an =NH group of an amine to a polyfunctional acrylate monomer with a functionality ranging from 2 to 6 with the amine =NH groups being in deficit with respect to the acrylate groups, so that there is at least one acrylate group per molecule of starting polyfunctional acrylate not saturated by the said amine groups. The amine used is preferably a monoamine and in particular a secondary amine, which can comprise a tertiary amine group (non-reactive by Michael addition).

Another category of monomers which are suitable as monomer f) in the composition according to the invention is the category of the urethane (meth)acrylate monomers. These are monomers which result from the reaction of an aliphatic, cycloaliphatic or aromatic monoisocyanate or polyisocyanate with hydroxyalkyl (meth)acrylates, preferably with the said alkyl being a C2 to C6 alkyl. According to a specific option of the composition according to the invention, the said monomer f) comprises one or more alkoxy units, preferably chosen from ethoxy, propoxy or butoxy or from their mixtures.

As regards the said urethane (meth)acrylate, polyester (meth)acrylate or polyether (meth)acrylate oligomer in the said component g), it can have a (meth)acrylate functionality ranging from 1 to 15. The said oligomer has a number-average molecular weight Mn which is greater than 600 and preferably of at least 800, more preferably of at least 1000. The Mn is determined by GPC as polystyrene equivalents in THF.

The urethane (meth)acrylate oligomers according to g) can be obtained, for example, from a polyisocyanate, a hydroxyalkyl (meth)acrylate with C2-C4 alkyl and an oligomer polyol, in particular oligomer diol, the said oligomer being chosen from polyester polyols, in particular diols, polyether polyols, in particular diols, or alkoxylated alkylene polyols and in particular alkoxylated alkylene diols, or from polycarbonate polyols and in particular diols.

The polyester (meth)acrylates according to g) are obtained from the partial or complete (meth)acrylation of polyester polyols (with corresponding functionality of OH making possible the final (meth)acrylate functionality after (meth)acrylation) which result from the polycondensation of a polyol with a polyacid with removal of the water of esterification. In particular, the polyester diols result from the polycondensation of a diacid. The polyester diols can also result from the polymerization of a cyclic lactone, such as caprolactone. They can be of aliphatic, cycloaliphatic or aromatic structure or of mixed structure, according to the structure of the diacid and diol precursor components.

The polyether (meth)acrylates according to g) result from the (meth)acrylation of polyether polyols (having a suitable OH functionality making possible the targeted final functionality of (meth)acrylates). The polyether polyol oligomers which can be used for this (meth)acrylation can be polyoxyethylene polyols, polyoxypropylene polyols, polyoxyethylene-polyoxypropylene random or block copolymers or polyoxytetramethylenes (polytetrahydrofurans or polyTHF).

As regards the said halogenated components a, c) and e) or optionally halogenated components b) and d), more particularly they comprise a halogen selected from bromine, chlorine and fluorine and preferably bromine. More particularly, they have a number of hydrogen atoms of the aromatic nucleus of the said halogenated or optionally halogenated compounds, replaced by a halogen, which varies from 1 to 2 per aromatic nucleus of the said halogenated or optionally halogenated component and preferably the said number is 2 hydrogen atoms replaced by a halogen per aromatic nucleus of the said component.

The composition according to the invention has a content by weight of the component a), with respect to the weight a)+b), which can vary from 20% to 80% and preferably from 35% to 65%.

As regards the content by weight of the said component c), with respect to the weight a)+b), it can vary from 0% to 50% and preferably from 5% to 35%.

As regards the content by weight of the component d), with respect to the weight a)+b), it can vary from 0% to 50% and preferably from 5% to 35%.

As regards the content by weight of the component e), with respect to the weight a)+b), it can vary from 0% to 50% and preferably from 5% to 30%.

As regards the content by weight of the component f), with respect to the weight a)+b), it can vary from 0% to 50% and preferably from 5% to 35%.

As regards the content by weight of the component g), with respect to the weight a)+b), it can vary from 0% to 40%, preferably from 10% to 30%.

According to a specific option, the composition according to the invention can comprise, in addition to a) et b) and optionally c) to g), at least one initiator.

The said initiator can be selected from a peroxide or hydroperoxide and, in this case, the said composition of the invention can be crosslinked by the thermal route or at low temperature in the presence of a reducing accelerator of the said peroxide or hydroperoxide. Use may be made, as reducing accelerator of the said peroxide or hydroperoxide which accelerates its decomposition at low temperature (in particular at ambient temperature: 15-25° C.), of a tertiary amine.

In an alternative option, the composition of the present invention can comprise an initiator which is at least one photoinitiator and, in this case, the said composition according to the invention can be crosslinked by UV radiation, including near UV/visible radiation, preferably by a UV/visible or near UV/visible lamp, by laser or by LED, preferably a near UV/visible lamp. The range of the wavelengths which corresponds to the near UV/visible radiation ranges from 355 to 415 nm and that which corresponds to the UV/visible ranges from 400 to 800 nm.

According to another alternative option, the composition according to the invention does not comprise any initiator and, in this case, it can be crosslinked only by EB radiation (that is to say, by an electron beam).

According to another alternative, the composition of the invention can be crosslinked by a dual route, which means that it combines at least two crosslinking techniques as defined above as other alternative routes. Mention may be made, as examples of dual routes under this alternative definition, of the combination of a route based on the presence of a peroxide/hydroperoxide with that where at least one photoinitiator is present. In such a case, the composition can be crosslinked either simultaneously or in successive stages by the thermal route or at low temperature in the presence of peroxide/hydroperoxide or by the route under UV radiation with the additional presence of a photoinitiator. For example, a rapid crosslinking by the UV route in the presence of a photoinitiator can be followed by an additional crosslinking by the thermal route as a result of the presence of a peroxide/hydroperoxide with the said photoinitiator, thus making it possible to round off/complete the crosslinking, in particular at a temperature greater than that of the UV crosslinking. This can in particular be advantageous when the glass transition temperature of the completely crosslinked composition is greater than that of the UV crosslinking temperature.

Mention may in particular be made, as examples of suitable peroxides, of: dialkyl, diaryl and aryl/alkyl peroxides, hydroperoxides, percarbonates, peresters, peracids and acyl peroxides.

Mention may in particular be made, as examples of decomposition (reducing) accelerators of peroxides or hydroperoxides, of: tertiary amines and/or of one or more reducing agents containing transition metal salts, such as iron, cobalt, manganese or vanadium carboxylates.

Mention may in particular be made, as examples of suitable photoinitiators, of derivatives of: benzoins, benzoin ethers, acetophenones, benzils, benzil ketals, anthraquinones, acylphosphine oxides, α-hydroxyketones, phenylglyoxylates, α-aminoketones, benzophenones, thioxanthones, xanthones, quinoxaline derivatives and triazine compounds.

Mention may in particular be made, as examples of particularly suitable radical photoinitiators, of: 2-methylanthraquinone, 2-ethylanthraquinone, 2-chloroanthraquinone, 2-benzylanthraquinone, 2-(t-butyl)anthraquinone, 1,2-benzo-9,10-anthraquinone, benzils, benzoins, benzoin ethers, benzoin methyl ether, benzoin ethyl ether, benzoin isopropyl ether, α-methylbenzoin, α-phenylbenzoin, Michler's ketones, acetophenones, benzophenones, benzophenone, 4,4'-bis(diethylamino)benzophenone, acetophenone, 2,2-diethoxyacetophenone, 4-ethoxyacetophenone, 2-isopropylthioxanthone, thioxanthone, diethylthioxanthone, 1,5-acetonaphthylene, ethyl p-dimethylaminobenzoate, (2,4,6-trimethylbenzoyl)diphenylphosphine oxide, 2,2-dimethoxy-1,2-diphenylethanone, 1-hydroxycyclohexyl phenyl ketone, 2-methyl-1-[4-(methylthio)phenyl]-2-morpholinopropan-1-one, 2-hydroxy-2-methyl-1-phenylpropanone, oligomeric α-hydroxy ketone, benzoylphosphine oxides, phenylbis(2,4,6-trimethylbenzoyl)phosphine oxide, ethyl 4-(dimethylamino)benzoate, ethyl (2,4,6-trimethylbenzoyl)phenylphosphinate, anthraquinone, (benzene)tricarbonylchromium, benzil, benzoin isobutyl ether, 3,3',4,4'-benzophenonetetracarboxylicdianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, 4'-ethoxyacetophenone, (2,4,6-trimethylbenzoyl)diphenylphosphine oxide, phenylbis(2,4,6-trimethylbenzoyl)phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methylbenzoyl formate, 2-methyl-4'-(methylthio)-2-morpholinopropiophenone, phenanthrenequinone, 4'-phenoxyacetophenone, (cumene)cyclopentadienyliron(II) hexafluorophosphate, 9,10-diethoxy- and 9,10-dibutoxyanthracene, 2-ethyl-9,10-dimethoxyanthracene, thioxanthen-9-one or any combination of the abovementioned initiators.

Preferably, the composition according to the invention has a viscosity at 25° C. according to the ISO 3219 (1993) method of less than 5000 mPa·s and preferably of less than 2500 mPa·s and more preferably of less than 1500 mPa·s. More particularly, after crosslinking, it has an HDT according to the ISO 75 (2004) method of at least 70° C. and preferably of greater than 80° C. In particular, after crosslinking, it has a Young's modulus at 25° C. according to the ISO 527 (1995) method of at least 1800 MPa, preferably of at least 2000 MPa.

Preferably, the composition according to the invention has an RI before crosslinking according to the ASTM 1218-02 standard of at least 1.47, preferably of greater than 1.52 and more particularly of greater than 1.56 and, after crosslinking, of at least 1.50 and preferably of greater than 1.55 and more particularly of greater than 1.59.

A second subject-matter of the invention relates to the use of a composition according to the invention for the preparation of coatings or of materials having an HDT according to the ISO 75 (2004) method of at least 70° C. and preferably of greater than 80° C. and/or an RI of at least 1.50, preferably of greater than 1.55 and more particularly of greater than 1.59.

More particularly, the said use relates to materials which are either 3D printed articles or materials different from 3D printed articles. The term "materials different from 3D printed articles" means in this instance materials for injection moulding/moulding processes (by definition, not printed). This is because the crosslinkable compositions according to the invention, apart from 3D printing, which is targeted in particular, are also suitable for the preparation of 3D objects (articles) by other methods, such as, for example, moulding.

According to a preferred option, the said use relates to 3D printed articles. These 3D printed articles can be printed by different processes, in particular by a layer-by-layer printing process or by a continuous process.

A "layer-by-layer" 3D printing process comprises the following stages:

a) depositing, on a surface, a first layer of crosslinkable composition according to the invention,
b) crosslinking the said first layer, at least partially, in order to obtain a first crosslinked layer,
c) depositing, on the said first crosslinked layer, a second layer of crosslinkable composition according to the invention,
d) crosslinking the said second layer, at least partially, in order to obtain a second crosslinked layer, which is stuck to the first crosslinked layer; and
e) repeating stages c) and d) the number of times necessary in order to obtain the final 3D (or three-dimensional) article.

The crosslinking routes which can be used are those already described above with a particular preference for the techniques for crosslinking under actinic radiation (UV, UV/visible, near UV/visible or under an electron beam EB).

The crosslinkable composition of the present invention can also be used in processes for the production of three-dimensional (3D) objects (articles) by a continuous process also known as CLIP (Continuous Liquid Interface (or Interphase) Product (or Printing)) method or process. This type of process is described in WO 2014/126830, WO 2014/126834 and WO 2014/126837 and in Tumbleston et al., "Continuous Liquid Interface Production of 3D Objects", Science, Vol. 347, Issue 6228, pp. 1349-1352 (Mar. 20, 2015).

The CLIP process proceeds by projection of a film or of a continuous sequence of images by actinic radiation, for example UV radiation, which images can be generated, for example, by a digital imaging unit, through a window transparent to the said actinic radiation and permeable to oxygen (inhibitor), located under a bath of the crosslinkable (curable) composition maintained in liquid form. A liquid interface below the (growing) article is maintained by the dead zone created above the window. The cured solid article is continuously extracted from the bath of crosslinkable composition above the dead zone, which can be regenerated by introducing, into the bath, additional amounts of the crosslinkable composition in order to compensate for the amounts of crosslinkable composition which are cured and incorporated in the growing article.

For example, a process for printing a three-dimensional article using the crosslinkable composition of the invention can comprise the following stages:

a) providing a substrate (or print platen) and an optically transparent element having a construction surface, the substrate and the construction surface defining, between them, a construction region,
b) filling the said construction region with the crosslinkable composition according to the invention,
c) continuously or intermittently irradiating the said construction region with actinic radiation, in order to form, starting from the crosslinkable composition, a crosslinked composition, and
d) continuously or intermittently, moving the said substrate away from the construction surface in order form the three-dimensional (3D) article with the crosslinked composition.

More particularly, the continuous printing process (CLIP type) can comprise the following stages: (a) providing a substrate (or print platen) and a stationary construction window, the construction window comprising a semi-permeable element, the said semi-permeable element comprising a construction surface and a feed surface separated from the construction surface with the said construction surface and the said substrate (or print platen) defining, between them, a construction region and with the feed surface in liquid contact with a polymerization inhibitor, (b) subsequently and at the same time and/or sequentially, filling the construction region with a crosslinkable composition according to the invention with the said composition being in contact with the print platen, (c) irradiating the construction region through the construction window in order to produce a solid polymerized region in the construction region with a remaining layer of liquid film consisting of the curable composition, formed between the solid polymerized region and the construction window, the polymerization of the liquid film being inhibited by the polymerization inhibitor, and (d) moving the print platen, to which the polymerized region is stuck, away from the construction surface of the stationary window in order to create a construction region between the polymerized region and the stationary construction window. Generally, the process includes stage (e), the repetition and/or the continuation of the stages from (b) to (d), in order to subsequently produce a polymerized region stuck to a region polymerized previously, until the continuous or repeated deposition of polymerized regions stuck to one another forms the targeted three-dimensional article.

The printed 3D articles obtained by the use of the crosslinkable (curable) composition according to the invention have, in particular, for the optical applications, a refractive index RI of at least 1.50, preferably of greater than 1.55 and more particularly of greater than 1.59.

More particularly, the optical applications targeted are for plastic lenses, in particular lenses for ophthalmic glasses, lenses for digital cameras or lenses for optical prisms, or optical coatings among optical overcoatings, hard optical coatings or anti-reflective films or for coatings of LED or of solar (photovoltaic) cells, or optical fibres, holograms, lenses for prisms and LED materials.

Another subject-matter also coming within the present invention relates to a crosslinked composition, which results from the crosslinking of at least one composition as defined above according to the invention.

Finally, the present invention also covers a finished product, which results from the crosslinking of at least one composition as defined according to the invention or which comprises at least one crosslinked composition as defined above.

The said finished product is in particular a coating, a moulded material, for example a composite material, or a 3D printed article.

More particularly, the said finished product is a 3D printed article and is preferably selected from: plastic lenses, in particular lenses for ophthalmic glasses, lenses for digital cameras or lenses for optical prisms, or optical coatings among optical overcoatings, hard optical coatings or anti-reflective films or for coatings of LED or of solar (photovoltaic) cells, or optical fibres, holograms, lenses for prisms and LED materials.

EXAMPLES

The following examples are given by way of illustration of the invention and of its performance qualities and do not in any way limit its coverage, the latter being defined by the claims.

EXAMPLES

1) Formulations

The compositions of the formulations tested according to Examples 1 to 5 are presented in Table 1 below starting from the following components:

Compound A: SR833S, Sartomer, tricyclodecanedimethanol diacrylate

Compound B: tetrabromo bisphenol A diglycidyl ether dimethacrylate

Compound C: tetrabromo bisphenol A diglycidyl ether tetramethacrylate

Compound D: biphenyl glycidyl ether dimethacrylate

Compound E: SR348L from Sartomer, bisphenol A ethoxylate (2) dimethacrylate

Compound F: HPMA from Evonik, hydroxypropyl methacrylate

Compound G: H008 from KPX Green Chemical, biphenylmethanol acrylate

TABLE 1

Compositions of the formulations tested of Examples 1 to 5

| Component | Example 1 | Example 2 | Example 3 | Example 4 | Example 5 |
|---|---|---|---|---|---|
| A | 14.0 | / | / | 13.30 | / |
| B | 27.0 | 12.50 | 13.20 | 25.65 | / |
| C | 27.0 | 29.25 | 30.85 | 25.65 | 42.75 |
| D | / | / | / | / | 23.75 |
| E | / | 16.75 | 17.70 | / | / |
| F | / | 10.0 | 5.0 | 5.0 | 5.0 |
| G | 32.0 | 31.5 | 33.25 | 30.40 | 28.50 |
| Total: | 100.0 | 100.0 | 100.0 | 100.0 | 100.0 |

2) Characteristics of the Liquid Formulations Before Crosslinking

These characteristics are presented in Table 2 below.

TABLE 2

Characteristics of the formulations tested of Examples 1 to 5

|  | Example 1 | Example 2 | Example 3 | Example 4 | Example 5 |
|---|---|---|---|---|---|
| Refractive index | 1.578 | 1.565 | 1.572 | 1.570 | 1.575 |
| Brookfield viscosity @ 25° C. (mPa · s) | 3200 | 750 | 1440 | 1880 | 1150 |

TABLE 2-continued

Characteristics of the formulations tested of Examples 1 to 5

|  | Example 1 | Example 2 | Example 3 | Example 4 | Example 5 |
|---|---|---|---|---|---|
| Colouration (Gardner) | 1.6 | 1.3 | 1.2 | 1.5 | 1.2 |

3) Physicochemical Characteristics After Crosslinking

Samples

The samples are prepared starting from silicone moulds. The bars (DMA, HDT, 3-point bending) have the dimensions, in mm, of 80*10*4 and the test specimens of 5A type for the tensile testing have a thickness of 4 mm. The photoinitiator system is TPO-L, 2% for all the formulae, and the crosslinking is carried out under 100% UV bench LED strip, followed by a postcuring at 80° C. for 12 hours.

Analytical Conditions:

Tests carried out at 23° C. under a relative humidity of 50%.

DMA Analysis:

The DMA analysis is carried out on an RDAIII device (Rheometrics), in rectangular torsion, with a sweep from −50° C. to 200° C., at 3° C./min, and a nominal strain of 0.05% and with a frequency of 1 Hz.

HDT (Standard ISO 75 of 2004):

The HDT (Heat Deflection Temperature) tests are carried out on the HDT device (EDIT). Method A is used (1.8 MPa); the test specimen (thickness of 4 mm) is positioned flat on the substrate (distance between supports=64 mm). The heating rate is 120° C./h.

Tensile Test:

The tensile tests are carried out on an MTS tensile testing device, 500 N cell. The test specimens used are of 5A type. The pull rate is 1 mm/min and then 10 mm/min starting from 7% elongation.

3-Point Bending (Standard ISO 178 of 2001)

The 3-point bending tests are carried out on an MTS tensile testing device in 3-point bending mode, the distance between supports of which is 16×the mean thickness of the batch. The test rate is 1 mm/min.

Results

The results of the performance qualities of the formulations tested of Examples 1 to 5 are presented in Table 3 below.

TABLEAU 3

Performance qualities of the formulations tested of Examples 1 to 5

|  | Example 1 | Example 2 | Example 3 | Example 4 | Example 5 |
|---|---|---|---|---|---|
| DMA (° C.) | 121 | 114 | 119 | 118 | 114 |
| HDT (° C.) | 86 | 93 | 86 | 95 | 94 |
| Tensile testing |  |  |  |  |  |
| Stress (MPa) | 31.3 +/− 3.5 | 30 +/− 6 | 30 +/− 6 | 30 +/− 8 | 25 +/− 8 |
| Elongation at break (%) | 1.5 +/− 0.1 | 1.6 +/− 0.5 | 1.7 +/− 0.5 | 1.4 +/− 0.5 | 1.1 +/− 0.3 |
| Modulus (MPa) | 2800 +/− 170 | 3100 +/− 160 | 3300 +/− 200 | 3000 +/− 150 | 2800 +/− 140 |
| 3-Point bending |  |  |  |  |  |
| Stress (MPa) | 79 +/− 0.4 | 91 +/− 1 | 81 +/− 10 | 82 +/− 11 | 55 +/− 18 |
| Deflection at break (mm) | 3.7 +/− 0.2 | 5.1 +/− 0.1 | 4.3 +/− 0.6 | 4.2 +/− 0.5 | 2.1 +/− 0.7 |
| Modulus (MPa) | 3775 +/− 64 | 3527 +/− 150 | 3474 +/− 118 | 3494 +/− 143 | 4100 +/− 100 |

The invention claimed is:

1. Crosslinkable composition comprising as component a) at least one halogenated bisphenol A diglycidyl ether tetra (meth)acrylate and as component b) at least one diluent from mono(meth)acrylates of a monoalcohol comprising a biphenyl structure, said biphenyl optionally being halogenated, and optionally at least one component chosen from components c), d), e), f) and g) as defined as follows:

c) at least one (meth)acrylated oligomer carrying at least 4 (meth)acrylate functional groups per chain, said oligomer comprising at least 2 units of halogenated bisphenol A structure in the chain of said oligomer, d) at least one di(meth)acrylate of an epoxidized biphenyl derivative, said biphenyl derivative optionally being halogenated, e) an optionally halogenated bisphenol A diglycidyl ether di(meth)acrylate, f) at least one monomer other than a), b), d) and e), g) at least one oligomer from urethane (meth)acrylate, polyester (meth)acrylate and polyether (meth)acrylate.

2. Composition according to claim 1, wherein said composition comprises component c) and said oligomer as defined according to c) comprises 2 units of halogenated bisphenol A structure in the chain of said oligomer.

3. Composition according to claim 1, wherein said composition comprises component d) and component d) is 2-biphenylyl glycidyl ether di(meth)acrylate.

4. Composition according to claim 1, wherein said composition comprises component f) and said monomer as defined according to f) has a functionality of (meth)acrylates ranging from 1 to 6 and is selected from mono(meth)acrylic esters of C1 to C18 aliphatic alcohols or of C6 to C18 cycloaliphatic alcohols or from polyfunctional (meth)acrylic esters of functionality 2 to 6 of C2 to C18 polyols, and optionally the said monomer f) comprises at least one unit of alkoxy structure.

5. Composition according to claim 1, wherein said composition comprises component f) and said monomer as defined according to f) comprises one or more alkoxy units, optionally chosen from ethoxy, propoxy or butoxy or from mixtures thereof.

6. Composition according to claim 1, wherein said composition comprises component g) and said at least one oligomer of component g) has a (meth)acrylate functionality ranging from 1 to 15.

7. Composition according to claim 1, wherein said halogenated or optionally halogenated components comprise a halogen selected from bromine, chlorine and fluorine.

8. Composition according to claim 1, wherein said halogenated or optionally halogenated compounds have a number of hydrogen atoms of the aromatic nucleus of the said halogenated or optionally halogenated compound, replaced by a halogen, which varies from 1 to 2 per aromatic nucleus of said halogenated or optionally halogenated component.

9. Composition according to claim 1, wherein said component a) is tetrabrominated bisphenol A diglycidyl ether tetramethacrylate of following formula (I):

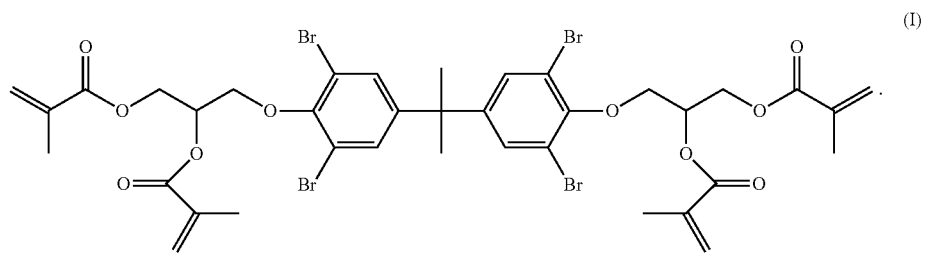 [SMILES: C=C(C)C(=O)OCC(COc1c(Br)cc(C(C)(C)c2cc(Br)c(OCC(COC(=O)C(=C)C)OC(=O)C(=C)C)c(Br)c2)cc1Br)OC(=O)C(=C)C]

10. Composition according to claim 1, wherein the component b) is biphenylmethanol mono(meth)acrylate of following formula (II):

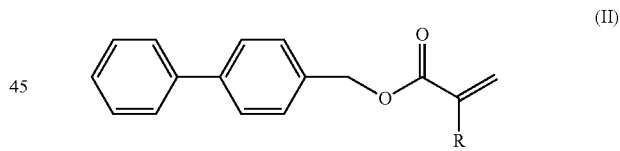

with R being methyl or H.

11. Composition according to claim 1, wherein said oligomer as defined according to c) is of following formula (III):

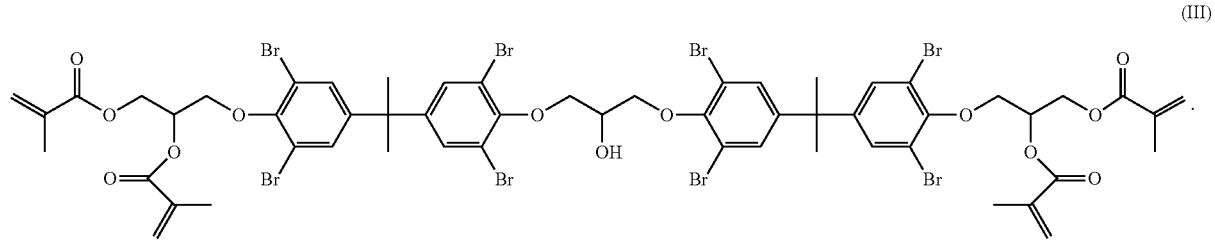 [SMILES: C=C(C)C(=O)OCC(COc1c(Br)cc(C(C)(C)c2cc(Br)c(OCC(O)COc3c(Br)cc(C(C)(C)c4cc(Br)c(OCC(COC(=O)C(=C)C)OC(=O)C(=C)C)c(Br)c4)cc3Br)c(Br)c2)cc1Br)OC(=O)C(=C)C]

12. Composition according to claim 1, wherein said monomer d) is 2-biphenylyl glycidyl ether dimethacrylate as defined according to the following formula (IVc):

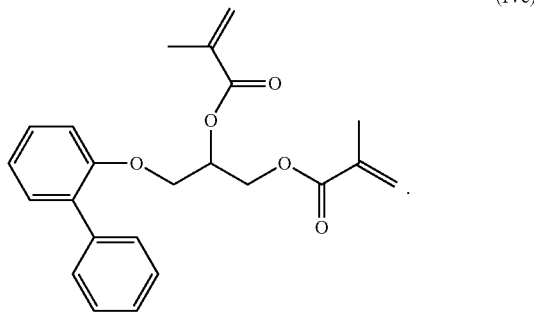

(IVc)

13. Composition according to claim 1, wherein the content by weight of the component a), with respect to the weight a)+b), varies from 20% to 80%.

14. Composition according to claim 1, wherein the content by weight of the component c), with respect to the weight a)+b), varies from 1% to 50%.

15. Composition according to claim 1, wherein the content by weight of the component d), with respect to the weight a)+b), varies from 1% to 50%.

16. Composition according to claim 1, wherein the content by weight of the component e), with respect to the weight a)+b), varies from 1% to 50%.

17. Composition according to claim 1, wherein the content by weight of f), with respect to the weight a)+b), varies from 1% to 50%.

18. Composition according to claim 1, wherein the content by weight of g), with respect to the weight a)+b), varies from 1% to 40%.

19. Composition according to claim 1, further comprising at least one initiator.

20. Composition according to claim 19, wherein said initiator is selected from a peroxide or a hydroperoxide.

21. Composition according to claim 19, wherein said initiator is at least one photoinitiator.

22. Composition according to claim 1, wherein said composition has a viscosity at 25° C. according to the ISO 3219 (1993) method of less than 5000 mPa·s.

23. Composition according to claim 1, wherein said composition has an RI before crosslinking according to the ASTM 1218-02 standard of at least 1.47 and, after crosslinking, of at least 1.50.

24. A method of using a composition according to claim 1 as a coating having at least one of an HDT according to the ISO 75 (2004) method of at least 70° and an RI of at least 1.50 comprising curing the composition to form the coating.

25. A method of using a composition according to claim 1, comprising curing the composition to form a 3D printed article.

26. A 3D printed made by the method of claim 25 having a refractive index RI of at least 1.50.

27. Composition according to claim 1, wherein the content by weight of the component a), with respect to the weight a)+b), varies from 35% to 65%.

28. Composition according to claim 1, wherein the content by weight of the component c), with respect to the weight a)+b), varies from 5% to 35%.

29. Composition according to claim 1, wherein the content by weight of the component d), with respect to the weight a)+b), varies from 5% to 35%.

30. Composition according to claim 1, wherein the content by weight of the component e), with respect to the weight a)+b), varies from 5% to 30%.

31. Composition according to claim 1, wherein the content by weight of f), with respect to the weight a)+b), varies from 5% to 35%.

32. Composition according to claim 1, wherein the content by weight of g), with respect to the weight a)+b), varies from 10% to 30%.

* * * * *